United States Patent
McCollough et al.

(10) Patent No.: US 9,676,476 B2
(45) Date of Patent: Jun. 13, 2017

(54) LIGHTWEIGHT HELICOPTER SKID SHOES

(71) Applicant: Bell Helicopter Textron Inc., Fort Worth, TX (US)

(72) Inventors: James M. McCollough, Arlington, TX (US); William A. Amante, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 340 days.

(21) Appl. No.: 14/589,548

(22) Filed: Jan. 5, 2015

(65) Prior Publication Data

US 2015/0336661 A1 Nov. 26, 2015

Related U.S. Application Data

(62) Division of application No. 13/533,835, filed on Jun. 26, 2012, now abandoned.

(51) Int. Cl.
*B64C 25/52* (2006.01)
*B64C 25/32* (2006.01)

(52) U.S. Cl.
CPC ........ *B64C 25/52* (2013.01); *B64C 2025/325* (2013.01)

(58) Field of Classification Search
None
See application file for complete search history.

(56) References Cited

U.S. PATENT DOCUMENTS 2,950,883 A * 8/1960 Landes .................. B64C 25/52
244/108
2,961,362 A * 11/1960 Landes .................. B29C 70/28
156/154

(Continued)

FOREIGN PATENT DOCUMENTS

CN 101092166 A 12/2007
WO 2008054401 A2 5/2008

OTHER PUBLICATIONS

European Search Report for related EP Application No. 12178623.0, Oct. 10, 2012, 9 pages, European Patent Office.

(Continued)

*Primary Examiner* — Medhat Badawi
(74) *Attorney, Agent, or Firm* — Kirby B. Drake; Klemchuk LLP

(57) ABSTRACT

A lightweight skid shoe assembly comprises a body of wear resistant, non-metallic or partially metallic material; and a structure coupling mechanism; wherein the body prevents friction-related damage to the structure. Another lightweight skid shoe assembly comprises a body of wear resistant, non-metallic or partially metallic material selected from the group consisting of: a polyamide or polyimide impregnated carbon fiber layup, a peek or PEI injection mold with carbon fiber, compression molded carbon fiber or fiberglass, a resin infusion with carbon fiber preform fabric, a fiber reinforced thermoset, acetal resin, machined acetal or thermoplastic, thermosetting plastic, or a metal-matrix composite; wherein the body prevents friction-related damage to a structure. Another lightweight skid shoe assembly comprises a body of wear resistant, non-metallic or partially metallic material; and a shear-bearing mechanism; wherein the shear-bearing mechanism directs shear forces away from the body; and (Continued)

wherein the body prevents friction-related damage to the structure.

20 Claims, 4 Drawing Sheets

(56) References Cited

U.S. PATENT DOCUMENTS

| | | | | | |
|---|---|---|---|---|---|
| 3,073,269 | A | * | 1/1963 | Schwegman | B23K 35/24 148/22 |
| 3,117,845 | A | * | 1/1964 | Reed | B64C 25/52 188/257 |
| 3,154,270 | A | * | 10/1964 | Jensen | B64C 25/56 244/101 |
| 3,395,879 | A | * | 8/1968 | Le Blanc | B64C 25/00 15/49.1 |
| 3,507,466 | A | * | 4/1970 | La Fleur | B64C 25/56 244/100 A |
| 3,524,517 | A | * | 8/1970 | La Fleur | B60V 1/16 180/119 |
| 3,778,334 | A | | 12/1973 | Sturgeon | |
| 4,194,040 | A | * | 3/1980 | Breton | B01J 37/00 264/122 |
| 4,196,878 | A | * | 4/1980 | Michel | B64C 25/52 244/108 |
| 4,270,711 | A | * | 6/1981 | Cresap | B64C 25/52 244/100 R |
| 4,344,641 | A | * | 8/1982 | Lehn | A63C 5/04 114/67 A |
| 4,390,151 | A | * | 6/1983 | Schneider | B64C 25/52 180/183 |
| 4,399,963 | A | * | 8/1983 | Schafer | B64C 25/64 244/104 R |
| 4,519,559 | A | * | 5/1985 | Logan | B64C 25/52 244/104 FP |
| 4,544,116 | A | * | 10/1985 | Shwayder | B64C 25/52 244/108 |
| 4,558,837 | A | * | 12/1985 | Mens | B64C 25/00 244/104 FP |
| 4,645,143 | A | * | 2/1987 | Coffy | B64C 25/52 244/100 R |
| 4,850,552 | A | * | 7/1989 | Darden | B64C 25/00 244/1 R |
| 5,109,580 | A | * | 5/1992 | Camus | B64C 25/52 24/458 |
| 5,164,247 | A | * | 11/1992 | Solanki | B22F 7/06 428/213 |
| 5,175,665 | A | * | 12/1992 | Pegg | B64D 45/02 244/1 A |
| 5,211,359 | A | * | 5/1993 | Rene | B64C 25/52 244/100 R |
| 5,224,669 | A | * | 7/1993 | Guimbal | B64C 25/52 244/100 R |
| 5,358,201 | A | * | 10/1994 | Brown, Sr. | B64C 25/52 244/108 |
| 5,462,242 | A | * | 10/1995 | Collins | B64C 25/52 244/108 |
| 5,735,484 | A | * | 4/1998 | Bradley | B64C 25/52 244/108 |
| 5,860,621 | A | * | 1/1999 | Barquet | B64C 25/52 244/108 |
| 5,893,532 | A | * | 4/1999 | Bain | B64C 25/52 244/108 |
| 6,000,117 | A | | 12/1999 | Bain | |
| 6,427,942 | B2 | | 8/2002 | Howard et al. | |
| 6,491,262 | B1 | * | 12/2002 | Kota | B64C 3/48 244/219 |
| 7,637,459 | B2 | * | 12/2009 | Mast | B64C 25/001 244/100 R |
| 2002/0008175 | A1 | * | 1/2002 | Howard | B64C 25/52 244/17.17 |
| 2003/0213178 | A1 | * | 11/2003 | Fanucci | B63B 19/16 49/371 |
| 2007/0107994 | A1 | * | 5/2007 | McClellan | F16D 66/028 188/1.11 W |
| 2008/0028720 | A1 | * | 2/2008 | Bartlett | E04B 5/10 52/846 |
| 2009/0084895 | A1 | * | 4/2009 | Holwerk | B64C 25/52 244/108 |
| 2009/0103870 | A1 | * | 4/2009 | Solomon | G02B 6/3801 385/98 |
| 2010/0044507 | A1 | * | 2/2010 | Smith | B64C 27/006 244/110 R |
| 2010/0230532 | A1 | * | 9/2010 | Dietrich | B64C 37/00 244/49 |
| 2010/0243798 | A1 | * | 9/2010 | Nakazawa | B29C 70/545 244/108 |
| 2011/0226898 | A1 | * | 9/2011 | Smith et al. | B64D 25/00 244/100 A |
| 2012/0043420 | A1 | * | 2/2012 | Prud'Homme-Lacroix | B64C 25/52 244/108 |
| 2013/0001362 | A1 | * | 1/2013 | Kreuzer | B64C 23/06 244/130 |
| 2013/0112810 | A1 | * | 5/2013 | Amante | B64C 25/52 244/108 |
| 2013/0341461 | A1 | * | 12/2013 | McCollough | B64C 25/52 244/108 |

OTHER PUBLICATIONS

English translation (machine) of CN101092166A, Dec. 26, 2007, 3 pages, Intellectual Property Publishing House of SIPO.

* cited by examiner

LIGHTWEIGHT HELICOPTER SKID SHOES

CROSS REFERENCE TO RELATED APPLICATION

This application claims priority to, and is a divisional of, U.S. patent application Ser. No. 13/533,835, filed Jun. 26, 2012, and entitled "Lightweight Skid Shoe Assembly," which is hereby incorporated by reference for all purposes.

FIELD OF THE DISCLOSURE

The present disclosure generally relates to a skid shoe assembly, and more particularly, to a lightweight skid shoe assembly that may protect a structure, such as a helicopter skid tube, from friction-related damage.

BACKGROUND

Many helicopters feature skid-type landing gear, which generally comprises an assembly of horizontal skid tubes connected by support structure the fuselage of the helicopter. Skid tubes may be damaged by repeated contact and friction with landing surfaces during takeoffs, landing, and ground transport. Pads of wear-resistant metal, known as skid shoes, are typically attached to the skid tubes to protect them from damage. While they offer effective protection, traditional skid shoes are relatively heavy, which can reduce the usable load capability of a helicopter.

SUMMARY

Embodiments of the present disclosure generally provide lightweight skid shoe assemblies for protecting the surface of a structure from friction-related damage.

The present disclosure is directed to a lightweight skid shoe assembly comprising a body having one or more layers of wear resistant, non-metallic or partially metallic material; and a coupling mechanism for coupling the body to a structure; wherein the body withstands shear forces when frictionally engaging a contact surface; and wherein the body substantially prevents friction-related damage to a surface of the structure to which it is coupled. In various embodiments, the material of at least one of the layers is selected from the group consisting of: a polyamide impregnated carbon fiber layup, a polyimide impregnated carbon fiber layup, a peek injection mold with carbon fiber, a polyetherimide injection mold with carbon fiber, compression molded carbon fiber, compression molded fiberglass, a resin infusion with carbon fiber preform fabric, a fiber reinforced thermoset, acetal resin, machined acetal, machined thermoplastic, thermosetting plastic, or a metal-matrix composite.

In various embodiments, the coupling mechanism comprises apertures in the body for receiving coupling hardware. In an embodiment, the coupling mechanism comprises coupling bolts. In another embodiment, the coupling mechanism comprises coupling straps.

In various embodiments, lightweight skid shoe assembly further comprises a shear-bearing mechanism operable to direct a portion of the shear forces away from the body when the body frictionally engages the contact surface. In an embodiment, the shear-bearing mechanism comprises a retainer having an opening; and the body is disposed within the retainer. In another embodiment, the depth of the opening is less than the thickness of the body. In yet another embodiment, a portion of the body extends through the opening.

In an embodiment, the shear-bearing mechanism comprises a recess in the structure; and the body is disposed within the recess. In another embodiment, a portion of the body extends beyond the recess. In yet another embodiment, walls of the recess are operable to direct a portion of the shear forces away from the body when the body frictionally engages the contact surface.

In an embodiment, the body further comprises a wear indicator for determining when the body needs to be replaced. In another embodiment, the body may be dispensed from a roll of body material.

In another aspect, the present disclosure is directed to a lightweight skid shoe assembly comprising a body having one or more layers of wear resistant, non-metallic or partially metallic material selected from the group consisting of: a polyamide impregnated carbon fiber layup, a polyimide impregnated carbon fiber layup, a peek injection mold with carbon fiber, a polyetherimide injection mold with carbon fiber, compression molded carbon fiber, compression molded fiberglass, a resin infusion with carbon fiber preform fabric, a fiber reinforced thermoset, acetal resin, machined acetal, machined thermoplastic, thermosetting plastic, or a metal-matrix composite; wherein the body substantially prevents friction-related damage to a surface of a structure to which it is coupled when the body frictionally engages a contact surface. In an embodiment, the body further comprises a wear indicator for determining when the body needs to be replaced.

In various embodiments, lightweight skid shoe assembly further comprises a coupling mechanism for coupling the body to the structure.

In an embodiment, lightweight skid shoe assembly further comprises a retainer coupled to the structure; wherein the body is disposed within the retainer; and wherein the retainer is operable to direct a portion of shear forces away from the body when the body frictionally engages the contact surface.

In an embodiment, lightweight skid shoe assembly further comprises a recess within the structure; wherein the body is disposed within the recess; and wherein walls of the recess are operable to direct a portion of shear forces away from the body when the body frictionally engages the contact surface.

In yet another aspect, the present disclosure is directed to a lightweight skid shoe assembly comprising a body having one or more layers of wear resistant, non-metallic or partially metallic material; and a shear-bearing mechanism within which the body is disposed; wherein the shear-bearing mechanism is operable to direct a portion of shear forces away from the body when the body frictionally engages a contact surface; and wherein the body substantially prevents friction-related damage to a surface of the structure to which it is coupled.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Embodiments of the present disclosure generally provide a lightweight skid shoe assembly for use in a variety of applications including, but not limited to, protecting helicopter skid landing gear and other structures from friction-related damage. The skid shoe assembly may be lighter than traditional skid shoe assemblies, thereby reducing a helicopter's empty weight and increasing its useful load. In various embodiments, lightweight skid shoe assembly may be easier to periodically replace than traditional skid shoe assemblies. In various embodiments, the skid shoe assembly may comprise a skid shoe body of wear-resistant materials, all or a portion of which having sacrificial wear properties, a shear-bearing coupling mechanism to alleviate shear forces acting on the skid shoe body, and/or a recess in a protected structure within which the skid shoe body is disposed.

FIGS. 1-6B illustrate representative embodiments of skid shoe assemblies 100, 150, 160, 170, 180 and parts thereof. It should be understood that the components of skid shoe assemblies 100, 150, 160, 170, 180 and parts thereof shown in FIGS. 1-6B are for illustrative purposes only, and that any other suitable components or subcomponents may be used in conjunction with or in lieu of the components comprising skid shoe assemblies 100, 150, 160, 170, 180 and the parts of skid shoe assemblies 100, 150, 160, 170, 180 described herein.

Figure 1:
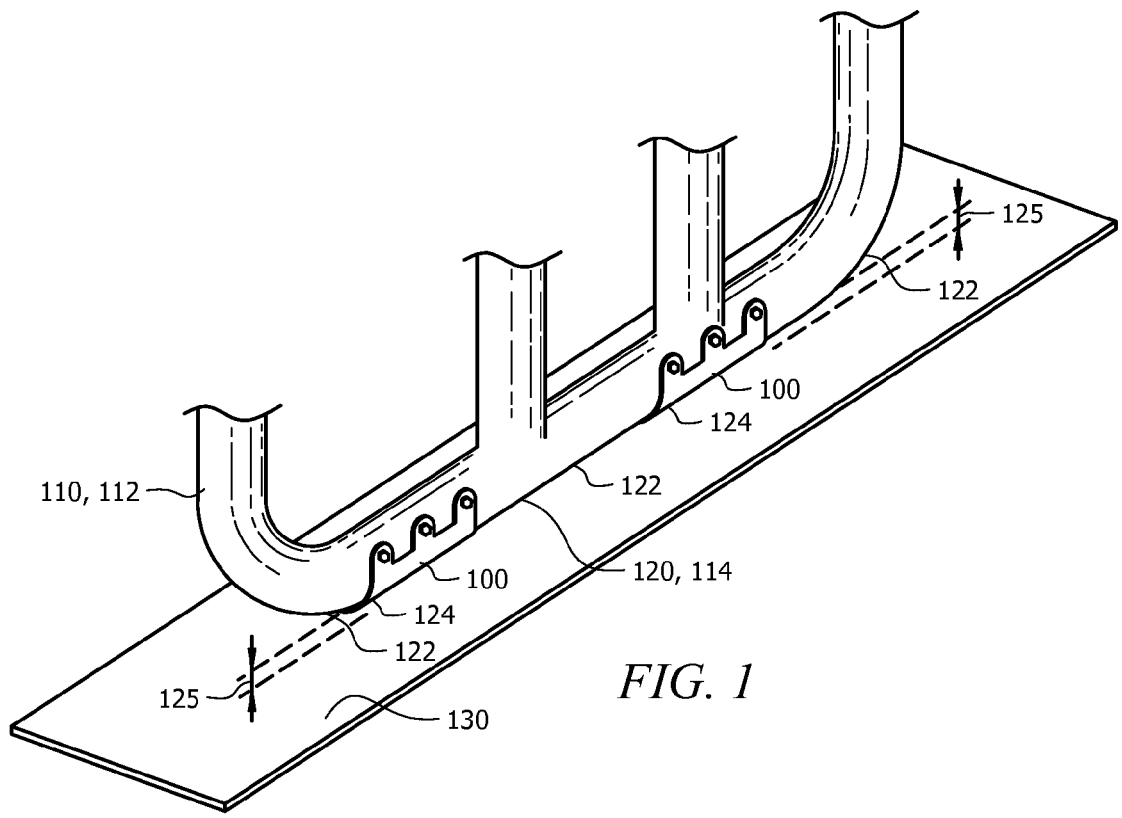
FIG. 1 depicts a perspective view of a series of skid shoe assemblies coupled to a helicopter skid tube according to an embodiment of the present disclosure.

Referring now to FIG. 1, a representative skid shoe assembly 100 is shown coupled to a protected structure 110, such as a helicopter skid tube 112. In one embodiment, a single skid shoe assembly 100 may generally cover a portion of, or substantially the entirety of, a protected surface 120 of the protected structure 110, such as the underside 114 of the helicopter skid tube 112, for example. In another embodiment, a series of skid shoe assemblies 100 may cover a portion of, or substantially the entirety of, the protected surface 120 of the protected structure 110. For example, as depicted in FIG. 1, a series of skid shoe assemblies 100 may be arranged in a spaced apart manner along the protected structure 110 to cover a portion of the protected surface 120, thereby resulting in uncovered portions 122 of the protected surface 120 and covered portions 124 of the protected surface covered by the skid shoe assemblies 100.

The series of skid shoe assemblies 100 may further be configured to minimize or prevent contact between the uncovered portions 122 of the protected surface 120 and a contact surface 130, such as a helicopter landing pad, for example. As depicted in FIG. 1, one or more skid shoe assemblies 100 may be configured to protrude a suitable distance from the protected surface 120 to create a gap 125 between the uncovered portions 122 of the protected surface 120 and the contact surface 130.

The skid shoe assemblies 100 may vary in size, shape, thickness, materials, and construction. Skid shoe assemblies 100 having larger exposed areas and/or more wear-resistant constructions may be disposed on high-traffic or high-friction protected surfaces 120 or portions thereof, while skid shoe assemblies 100 having smaller exposed areas and/or less wear-resistant constructions may be disposed on lower-traffic or lower-friction protected surfaces 120 or portions thereof.

Some non-metallic constructions may offer less protection or be less durable than metallic constructions in certain applications. In a helicopter context, heavy-duty metallic skid shoes may still be needed under rigorous operating conditions involving numerous and/or hard landings, such as training or certification testing. It is not uncommon for helicopters to touch down and slide on a runway at speeds in excess of 60 knots during engine failure simulations, for example. Under normal operating conditions, however, operators often use medium-duty skid shoes to save weight and boost useful load as hard landings and landings on unprepared surfaces are far less common. Non-metallic skid shoe constructions are well suited for such conditions, as they may provide the requisite level of protection, while offering a lower weight penalty and easier replacement. In the event of a hard landing that exceeds the structural capabilities of the non-metallic skid shoe assembly 100, an operator may be required to replace the skid landing gear. Many operators would view this as an acceptable cost of doing business given the relative infrequency of such events.

Figure 2:
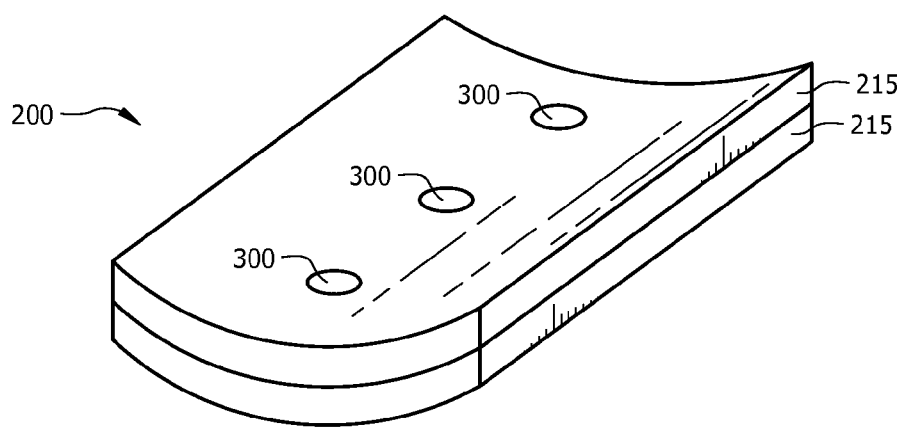
FIG. 2 depicts a perspective view of a representative multi-layer skid shoe body according to an embodiment of the present disclosure.

Referring now to FIG. 2, the skid shoe assembly 100 may comprise a skid shoe body 200 having one or more layers 215 of lightweight, wear-resistant, non-metallic or partially metallic materials that may include, but are not limited to, a polyamide impregnated carbon fiber layup, a polyimide impregnated carbon fiber layup, a peek or PEI injection mold with carbon fiber, compression molded carbon fiber or fiberglass, a resin infusion with carbon fiber preform fabric, a fiber reinforced thermoset, acetal resin (such as DuPont™ Delrin®), machined acetal (or any wear resistant and structurally robust thermoplastic or thermosetting plastic), formed thermoplastics or thermosetting plastic, a metal-matrix composite, or any other lightweight non-metallic or partially metallic materials with sufficient capability for wear. One having ordinary skill in the art will recognize that skid shoe body may be comprised of any number of suitable lightweight, wear-resistant, non-metallic or partially metallic materials and constructions, and the present disclosure should not be limited to only the examples provided herein. In various embodiments, skid shoe body 200 may further comprise materials and/or constructions that provide for structural reinforcement. In one embodiment, skid shoe body 200 may comprise injection-molded nylon with fiberglass or carbon fiber reinforcement. In another embodiment, skid shoe body may comprise compression molded carbon fiber or fiberglass with one or more integral co-molded steel wear strips. All or a portion of skid shoe body 200 may have sacrificial wear properties. In various embodiments, one or more layers 215 of body 200 may be classified as "sacrificial" layers, being comprised of any suitable wear-resistant material such as those described in this paragraph that may gradually wear away due to repeated frictional contact with contact surface 130. In a helicopter application, wear rate may be a function of the number of landings, any fore/aft or lateral skidding during landings, and the surface properties of the landing area. In various embodiments, body 200 may comprise one or more layers 215 of lightweight, yet structurally robust material, that may be suitable to withstand all or a portion of shear loads occurring at the junction(s) of skid shoe body 200 with protected structure 110. Skid shoe body 200 may further comprise coupling points 300 that may be defined by flanges or apertures extending from or disposed through body 200, respectively, for coupling the layers 215 of the skid shoe body 200 together and/or for coupling the skid shoe body 200 to the protected structure 110.

In various embodiments, body 200 may be manufactured such that it may be disposed from a roll much like adhesive tape. A user may unroll a desired amount of body material from the roll and cut it to customized dimensions for coupling to the protected structure. In an embodiment, an amount corresponding with a dimension of the protected surface may be dispensed. In another embodiment, smaller sections may be dispensed and spaced in any suitable interval or pattern on the protected surface. A user may find such an embodiment beneficial for reasons including, but not limited to, less material waste, the ability to customize skid shoe dimensions, flexibility to "patch" high wear areas, and reduced cost from not having to buy custom-made skid shoes for one or more applications. One having ordinary skill in the art will recognize that body 200 may be manufactured any suitable manner and form, and the present disclosure should not be limited to the specific embodiments described herein.

Figure 3:
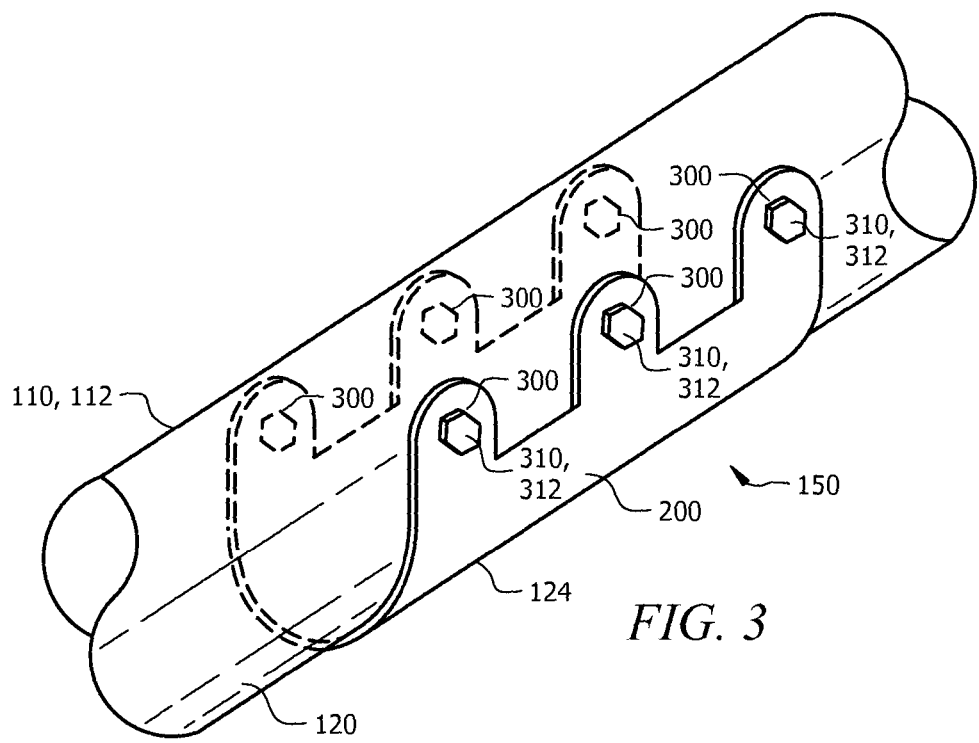
FIG. 3 depicts a perspective view of a skid shoe assembly comprising bolts coupled to the protected structure of a helicopter skid tube according to an embodiment of the present disclosure.
Figure 4:
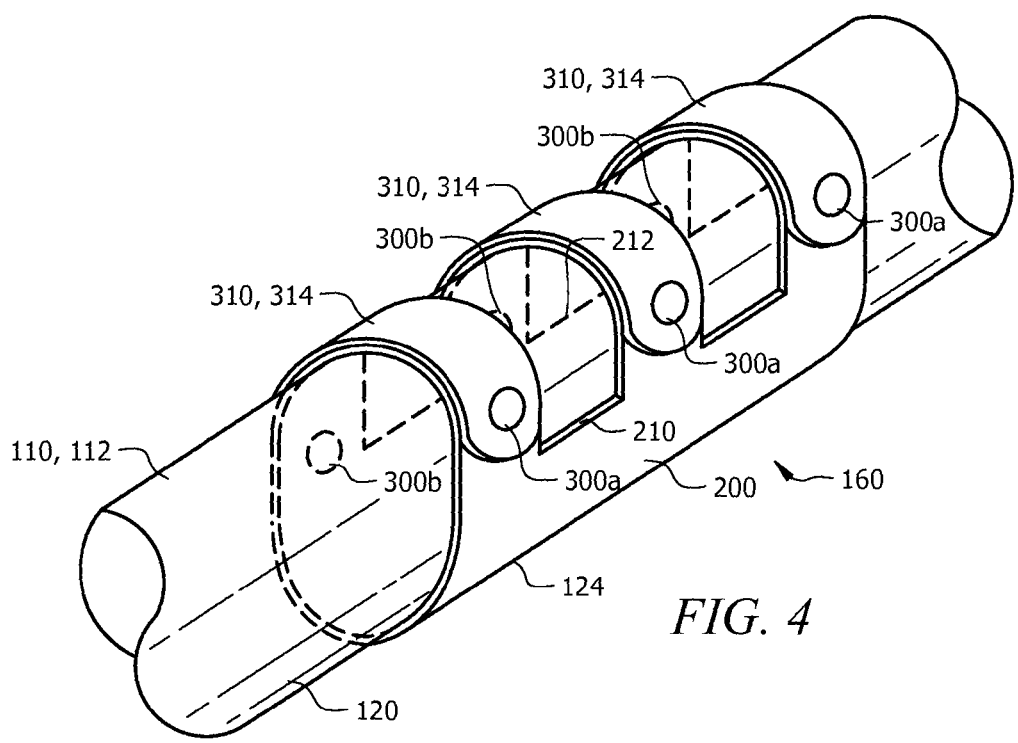
FIG. 4 depicts a perspective view of a skid shoe assembly comprising straps coupled to the protected structure of a helicopter skid tube according to an embodiment of the present disclosure.

FIGS. 3 and 4 each depict an embodiment of a skid shoe assembly 150, 160 comprising a coupling mechanism 310 for coupling the skid shoe body 200 to a protected structure 110, such as a helicopter skid tube 112, to cover at least a portion of a protected surface 120, such as the underside 114 of the helicopter skid tube 112, for example. In various embodiments, coupling mechanism 310 may react all or a portion of shear loads on the skid shoe body 200. In an embodiment, coupling mechanism 310 may couple a skid shoe body 200 to a skid tube 112 and may resist fore/aft slippage of body 200 on skid tube 112 during a run-on landing. In another embodiment, coupling mechanism 310 may resist lateral slippage of body 200 on skid tube 112 that would otherwise be caused by rotational movement of the skid tube 112 when flexing (spreading) under the vertical landing load of the helicopter.

Referring now to FIG. 3, the coupling mechanism 310 of the skid shoe assembly 150 comprises a bolt 312 or a series of bolts 312 to secure the skid shoe body 200 to the helicopter skid tube 112 at discrete coupling points 300. The bolts 312 project through the skid shoe body 200 at coupling points 300 and into the protected structure 110, thereby securing skid shoe 200 thereon and covering a portion 124 of the protected surface 120. In an embodiment, bolt 312 may have a tapered head for improved shear reaction. During helicopter landings, as the helicopter skid tube 112 touches down, the skid shoe body 200 will make frictional, engaging contact with the contact surface 130, while generally preventing wearing engagement of the protected surface 120, 114 with the contact surface 130. With multiple helicopter landings, the skid shoe body 200 will gradually wear away due to such frictional engaging contact with the contact surface 130, and eventually, layers 215 of the skid shoe body 200, or the entire skid shoe body 200, will need to be replaced. The worn skid shoe body 200 may be removed by releasing the bolts 302 at the discrete contact points 300 that secure the skid shoe body 200 to the protected structure 110, 112.

Referring now to FIG. 4, the coupling mechanism 310 of skid shoe assembly 160 comprises a strap 314 or a series of straps 314 that extend from coupling point(s) 300a located near a first edge 210 of the skid shoe body 200, then wrap around the protected structure 110, 112, and connect to corresponding coupling point(s) 300b located near a second opposing edge 212 of skid shoe body 200. In an embodiment, straps 314 comprise band clamps. Similarly, coupling mechanism 310 may comprise a collar (not shown) that may enshroud all or a portion of skid shoe body 200 and protected structure 110, thereby coupling them together and providing a mechanism to react all or a portion of shear loads acting thereon. In an embodiment, collar may be heat shrinked, bonded, or mechanically fastened to protected structure 110. During helicopter landings, as the helicopter skid tube 112 touches down, the skid shoe body 200 will make frictional, engaging contact with the contact surface 130, while generally preventing wearing engagement of the protected surface 120, 114 with the contact surface 130. With multiple helicopter landings, the skid shoe body 200 will gradually wear away due to such frictional engaging contact with the contact surface 130, and eventually, layers 215 of the skid shoe body 200, or the entire skid shoe body 200, will need to be replaced. The worn skid shoe body 200 may be removed by releasing the straps 314 securing the skid shoe body 200 to the protected surface 110, 112.

With respect to skid shoe assemblies 150, 160 shown in FIGS. 3 and 4, shear loads may be concentrated at the coupling points 300, 300a, 300b. As such, the skid shoe body 200 may have inherent shear strength properties sufficient to withstand shear frictional forces associated with engaging a contact surface 130 without suffering damage or becoming dislodged. If necessary, skid shoe body 200 may comprise reinforced materials or reinforcing mechanisms (such as grommets, not shown) at coupling points 300, 300a, 300b. One having ordinary skill in the art will appreciate that specific shear strength requirements are application dependent, and will recognize a suitable construction for the skid shoe body 200 and coupling mechanisms 310 described herein for a given application.

Figure 5A:
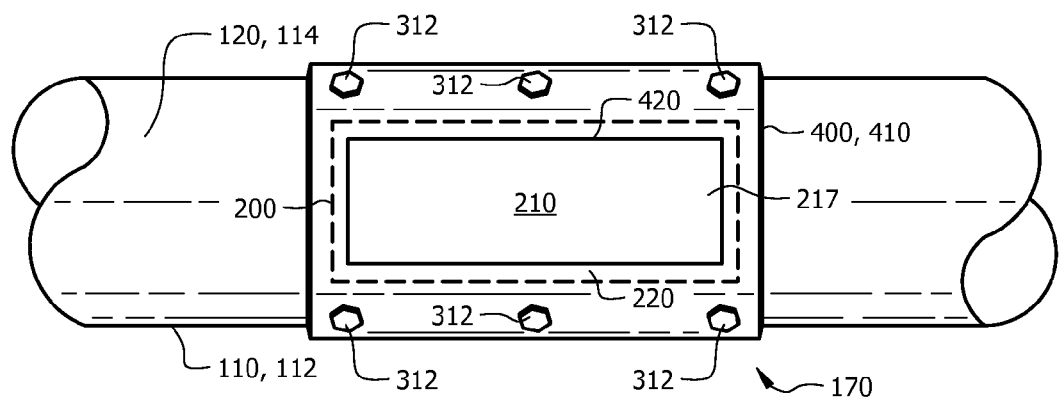
FIG. 5A depicts a bottom view of a skid shoe assembly comprising a shear-bearing retainer coupled to the protected structure of a helicopter skid tube according to an embodiment of the present disclosure.
Figure 5B:
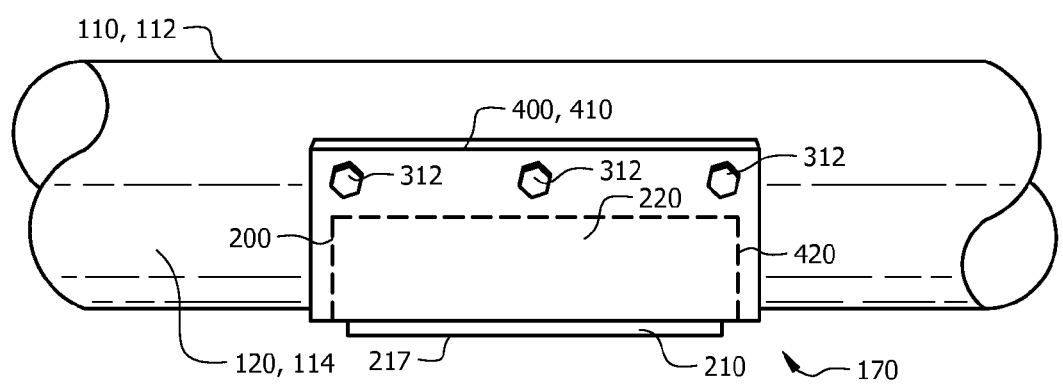
FIG. 5B depicts a side view of the skid shoe assembly of FIG. 5A according to an embodiment of the present disclosure.

FIGS. 5A and 5B depict a bottom plan view and a side elevation view, respectively, of another embodiment of a skid shoe assembly 170 comprising one or more shear-bearing mechanisms 400. Shear-bearing mechanism 400 may comprise any mechanism suitable to direct a significant portion of the shear stress on skid shoe assembly 170 away from the skid shoe body 200 and distribute such shear stress throughout the shear-bearing mechanism 400.

In an embodiment, the shear-bearing mechanism 400 comprises one or more retainers 410 for coupling the skid shoe body 200 to a protected surface 120, 114 of the protected structure 110, 112. Retainer 410 may be constructed of any suitable non-metallic, partially metallic, or metallic material and may be of any suitable planform to cover a portion of, or substantially the entirety of, skid shoe body 200. As best shown in FIG. 5A, retainer 410 may comprise one or more openings 420 that may be substantially equal to or smaller in dimension than skid shoe body 200. As best shown in FIG. 5B, retainer 410 may further have a thickness substantially equal to or less than the thickness of body 200. Retainer 410 may wrap around skid shoe body 200 and at least partially surround the protected structure 110, 112, thereby coupling the skid shoe body 200 to the protected structure 110, 112 and covering a portion 124 of the protected surface 120, 114. In an embodiment, a bolt 312 or a series of bolts 312 may be used to secure the retainer 410 to the protected structure 110, 112.

As best shown in FIG. 5B, retainer 410 may be oriented relative to skid shoe body 200 such that a substantial portion of skid shoe body 200 projects through each opening 420, resulting in exposed portions 210 and unexposed portions 220 of skid shoe body 200. Such a configuration may result in the retainer 410 applying shear support to the unexposed portions 220 of skid shoe body 200, while allowing the exposed portions 210 of skid shoe body 200 to engage a contact surface 130. One having ordinary skill in the art will be capable of determining a suitable size of opening 420 in retainer 410, as well as a suitable thickness of retainer 410, based on the desired amount of shear support to be provided to the unexposed portions 220 of skid shoe body 200 and the desired amount of area for exposed portions 210 of skid shoe body 200. Shear-bearing coupling mechanisms 400 may be used as the sole means of coupling skid shoe body 200 to protected structure 110, 112, or in addition to other coupling mechanisms 300.

During helicopter landings, as the helicopter skid tube 112 touches down, the lower surface 217 of the exposed portions 210 of skid shoe body 200 will make frictional, engaging contact with the contact surface 130, while generally preventing wearing engagement of the protected surface 120, 114 with the contact surface 130. Simultaneously, the retainer 410 will provide shear support to the unexposed portions 220 of the skid shoe body 200 during such landings.

With multiple helicopter landings, the exposed portions 210 of the skid shoe body 200 will gradually wear away due to such frictional engaging contact with the contact surface 130, and eventually, layers 215 of the skid shoe body 200, or the entire skid shoe body 200, will need to be replaced. In various embodiments, skid shoe body 200 may comprise a visual indicator to indicate the degree of wear and tear. In one embodiment, body 200 may be imbedded with one or more colors at various depths to indicate the degree of wear. In another embodiment, body 200 comprises layers 215 of different materials that may be visually distinguished from each other. When "sacrificial" layers have worn away, non-sacrificial will begin to show, indicating the need for replacement. While wear may be visible on traditional metallic skid shoes, it can be difficult to ascertain its remaining thickness without removing it from the aircraft. If a maintainer waits too long to replace a skid shoe, it may wear completely through in certain areas, exposing the skid tube to friction-related damage. Alternatively, it can be pricey to replace skid shoes too often. Visible indication of wear, be it through some sort of layered color band, exposure of a different material in the skid shoe body, or any other suitable mechanism, is a benefit of embodiments of the present disclosure.

The worn skid shoe body 200 may be removed by releasing the bolts 312 securing the retainer 410 to the protected surface 110, 112 and then removing the skid shoe body 200 from the retainer 410. Alternatively, layers 215 of the worn skid shoe body 200 comprising the exposed portions 210 may be removed and replaced without removing the retainer 410 by accessing such layers 215 through the opening 420 via coupling points 300 on the skid shoe body 200, as shown in FIG. 2. The abilities to accurately determine the serviceability of the shoe 100 and easily replace them are benefits of embodiments of the present disclosure as they are not generally available with traditional fully-metallic skid shoes.

Figure 6A:
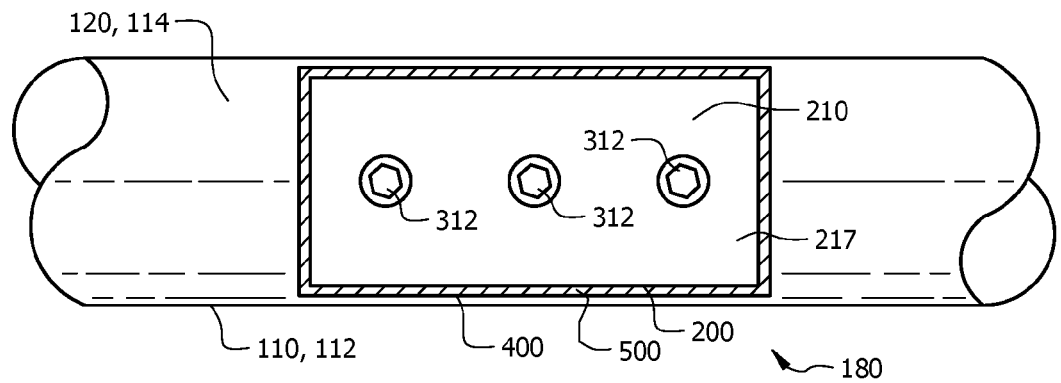
FIG. 6A depicts a bottom view of a skid shoe assembly comprising a skid shoe body disposed in a shear-bearing recess formed in a helicopter skid tube according to an embodiment of the present disclosure.
Figure 6B:
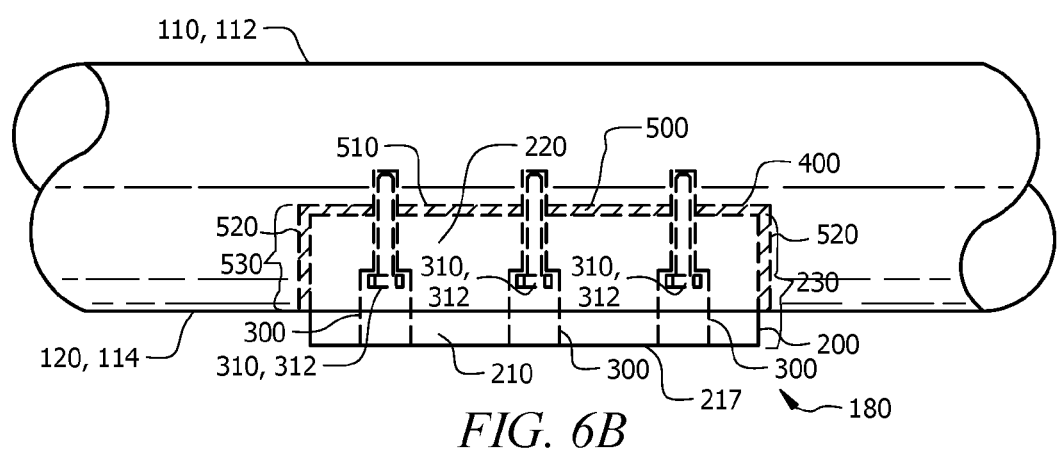
FIG. 6B depicts a side view of the skid shoe assembly of FIG. 6A.

FIGS. 6A and 6B depict a bottom plan view and a side elevation view, respectively, of another embodiment of a skid shoe assembly 180 comprising one or more shear-bearing mechanisms 400. In an embodiment, the shear-bearing mechanism 400 comprises a recess 500 in the protected structure 110, 112 within which a skid shoe body 200 may be disposed. As best shown in FIG. 6A, recess 500 may be substantially equal in planform shape and size to skid shoe body 200, and as best shown in FIG. 6B, recess 500 may have recess depth 530 substantially equal to or less than body thickness 230 of skid shoe body 200. The skid shoe body 200 may be disposed within recess 500 and coupled to one or more coupling surfaces 510 within the recess 500 by any coupling mechanism 310 suitable to secure skid shoe body 200 thereon. In an embodiment, a bolt 312 or a series of bolts 312 may be used to secure the skid shoe body 200 to the coupling surfaces 510 at discrete coupling points 300. Similar to the shear-bearing retainer 410 of skid shoe assembly 170, the coupling surfaces 510 and walls 520 of recess 500 may apply shear support to the unexposed portions 220 of skid shoe body 200, and the depth of the walls 520 may allow for exposed portions 210 of skid shoe body 200 to engage a contact surface 130. One having ordinary skill in the art will be capable of determining a suitable size of recess 500, as well as a suitable depth of walls 520, based on the desired amount of shear support to be provided to the unexposed portions 220 of skid shoe body 200 and the desired amount of area for exposed portions 210 of skid shoe body 200.

During helicopter landings, as the helicopter skid tube 112 touches down, the lower surface 217 of the exposed portions 210 of skid shoe body 200 will make frictional, engaging contact with the contact surface 130, while generally preventing wearing engagement of the protected surface 120, 114 with the contact surface 130. Simultaneously, the walls 520 of the recess 500 will provide shear support to the unexposed portions 220 of the skid shoe body 200 during such landings. With multiple helicopter landings, the exposed portions 210 of the skid shoe body 200 will gradually wear away due to such frictional engaging contact with the contact surface 130, and eventually, layers 215 of the skid shoe body 200, or the entire skid shoe body 200, will need to be replaced. Layers 215 or the entire worn skid shoe body 200 may be removed by releasing the bolts 312 securing the skid shoe body 200 to the coupling surfaces 210 and then removing the layers 215 or the entire skid shoe body 200 from the recess 500.

Skid shoe assembly 100 may further comprise a wear skin (not shown) for protecting uncovered portions 122 of a protected surface 120. Wear skin may comprise a thin layer of any suitable non-metallic wear-resistant material. Wear skin may offer scratch protection from debris (rocks, gravel, sand, etc) on an unprepared landing surface. In an embodiment, wear skin may be applied to uncovered portions 122 exposed by gaps 125 between skid shoe bodies 200. In another embodiment, wear skin may be disposed from a roll much like adhesive tape.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A lightweight skid shoe assembly, comprising:
a removable and replaceable body coupled directly to a skid tube, the body having one or more layers of wear resistant, non-metallic or partially metallic material;
an exposed portion of the body provided to make frictional, engaging contact with a contact surface and gradually wear away;
an unexposed portion of the body in which one or more retainers are arranged to wrap around a perimeter of the body, couple the body to the skid tube, and provide shear support without wearing away; and
a shear-bearing mechanism, comprising:
the one or more retainers oriented relative to the body such that at least a portion of the body projects through one or more openings of each of the one or more retainers;
wherein the body substantially prevents friction-related damage to the skid tube when the body frictionally engages the contact surface; and
wherein the shear-bearing mechanism is operable to direct shear forces away from the body when the body frictionally engages the contact surface.

2. The lightweight skid shoe assembly of claim 1, wherein the shear-bearing mechanism comprises a recess in the skid tube.

3. The lightweight skid shoe assembly of claim 2, wherein a recess depth of the recess is substantially equal to or less than a body thickness of the body.

4. The lightweight skid shoe assembly of claim 2, wherein the unexposed portion of the body is positioned within the recess; and wherein the exposed portion of the body extends beyond the recess.

5. The lightweight skid shoe assembly of claim 4, wherein walls of the recess are operable to apply shear support to the unexposed portion of the body when the body frictionally engages the contact surface.

6. The lightweight skid shoe assembly of claim 1, further comprising at least one coupling mechanism to couple the body to the skid tube, the coupling mechanism arranged to react at least a portion of shear loads on the body, wherein the shear loads occur at junctions of the body with the skid tube.

7. The lightweight skid shoe assembly of claim 6, wherein the at least one coupling mechanism is operable to couple the body to one or more coupling surfaces within the shear-bearing mechanism.

8. The lightweight skid shoe assembly of claim 1, wherein the material of at least one of the layers is selected from the group consisting of: a polyamide impregnated carbon fiber layup, a polyimide impregnated carbon fiber layup, a peek injection mold with carbon fiber, a polyetherimide injection mold with carbon fiber, compression molded carbon fiber, compression molded fiberglass, a resin infusion with carbon fiber preform fabric, a fiber reinforced thermoset, acetal resin, machined acetal, machined thermoplastic, thermosetting plastic, or a metal-matrix composite.

9. The lightweight skid shoe assembly of claim 1, wherein the body further comprises a wear indicator for determining when the layers of the body need to be replaced.

10. The lightweight skid shoe assembly of claim 1, wherein the body is dispensed from a roll of body material.

11. A lightweight skid shoe assembly, comprising:
a removable and replaceable body coupled directly to a skid tube, the body having one or more layers of wear resistant, non-metallic or partially metallic material;
an exposed portion of the body provided to make frictional, engaging contact with a contact surface and gradually wear away;
an unexposed portion of the body in which one or more retainers are arranged to wrap around a perimeter of the body, couple the body to the skid tube, and provide shear support without wearing away;
one or more openings of each of the one or more retainers in which at least a portion of the body projects through the one or more openings; and
a recess in the skid tube, wherein the body is disposed within the recess;
wherein the body substantially prevents friction-related damage to a surface of the skid tube when the body frictionally engages and at least partially surrounds the contact surface.

12. The lightweight skid shoe assembly of claim 11, wherein the material of at least one of the layers is selected from the group consisting of: a polyamide impregnated carbon fiber layup, a polyimide impregnated carbon fiber layup, a peek injection mold with carbon fiber, a polyetherimide injection mold with carbon fiber, compression molded carbon fiber, compression molded fiberglass, a resin infusion with carbon fiber preform fabric, a fiber reinforced thermoset, acetal resin, machined acetal, machined thermoplastic, thermosetting plastic, or a metal-matrix composite.

13. The lightweight skid shoe assembly of claim 11, further comprising:
a coupling mechanism for coupling the body to the skid tube, the coupling mechanism arranged to react at least a portion of shear loads on the body, wherein the shear loads occur at junctions of the body with the skid tube.

14. The lightweight skid shoe assembly of claim 13, further comprising an aperture in the body for receiving the coupling mechanism to couple the body to the skid tube.

15. The lightweight skid shoe assembly of claim 13, wherein the coupling mechanism comprises a coupling bolt.

16. The lightweight skid shoe assembly of claim 13, wherein the coupling mechanism is operable to couple the body to a coupling surface within the recess.

17. The lightweight skid shoe assembly of claim 11, wherein walls of the recess are operable to direct a portion of shear forces away from the body when the body frictionally engages the contact surface.

18. The lightweight skid shoe assembly of claim 11, wherein the body further comprises a wear indicator for determining when layers of the body needs to be replaced.

19. The lightweight skid shoe assembly of claim 11, wherein the body is dispensed from a roll of body material.

20. A lightweight skid shoe assembly, comprising:
- a removable and replaceable body having one or more layers of wear resistant, non-metallic or partially metallic material selected from the group consisting of: a polyamide impregnated carbon fiber layup, a polyimide impregnated carbon fiber layup, a peek injection mold with carbon fiber, a polyetherimide injection mold with carbon fiber, compression molded carbon fiber, compression molded fiberglass, a resin infusion with carbon fiber preform fabric, a fiber reinforced thermoset, acetal resin, machined acetal, machined thermoplastic, thermosetting plastic, or a metal-matrix composite;
- a skid tube to which the body is directly coupled;
- an exposed portion of the body provided to make frictional, engaging contact with a contact surface and gradually wear away;
- an unexposed portion of the body in which one or more retainers are arranged to wrap around a perimeter of the body, couple the body to the skid tube, and provide shear support without wearing away;
- one or more retainers oriented relative to the body such that at least a portion of the body projects through one or more openings of each of the one or more retainers;
- wherein the body is disposed within a recess in the skid tube such that the unexposed portion of the body is positioned within the recess and the exposed portion of the body extends beyond the recess;
- wherein the body substantially prevents friction-related damage to a surface of the skid tube when the exposed portion of the body frictionally engages a contact surface; and
- wherein walls of the recess are operable to provide shear support to the unexposed portion of the body when the exposed portion of the body frictionally engages the contact surface.

* * * * *